Nov. 30, 1943.   J. A. REYNIERS   2,335,697
PHOTOGRAPHIC APPARATUS
Filed Dec. 9, 1940
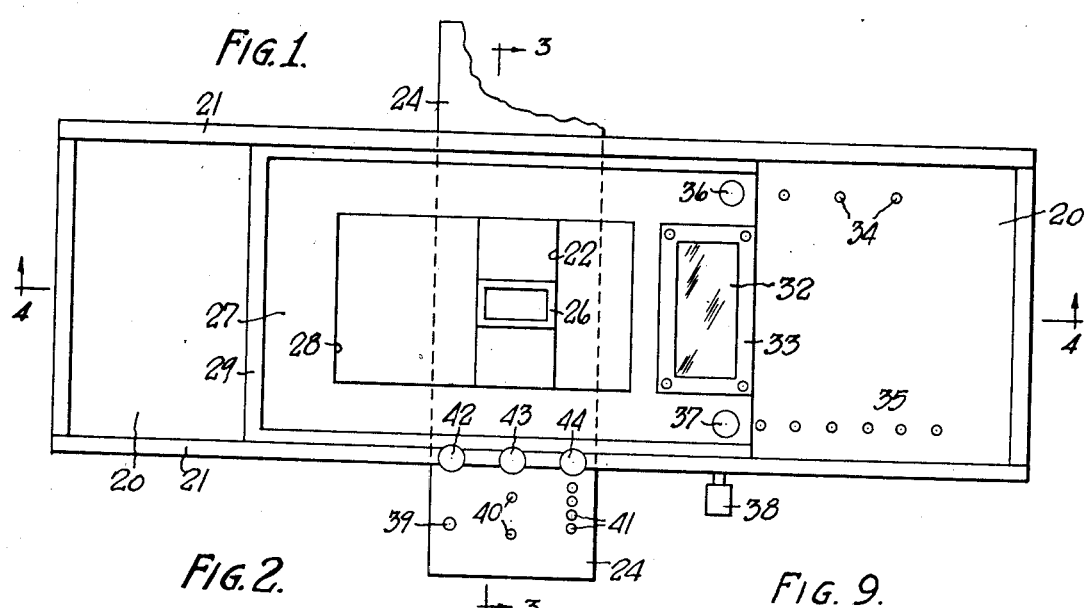
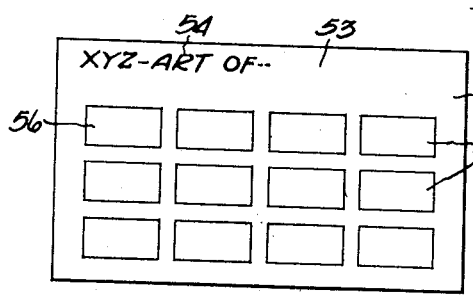
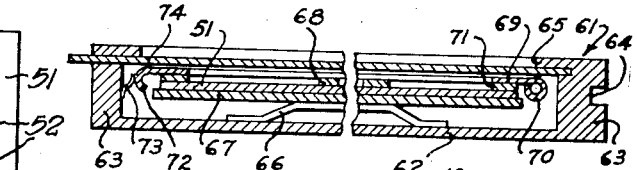
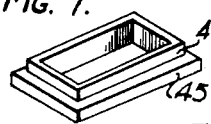
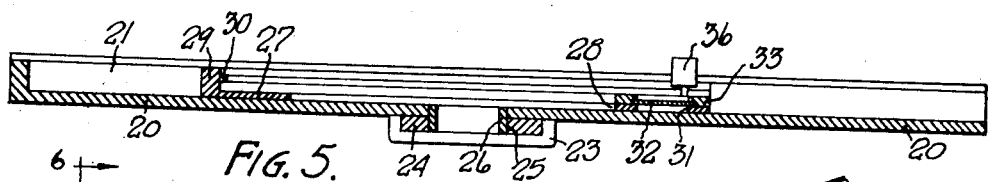
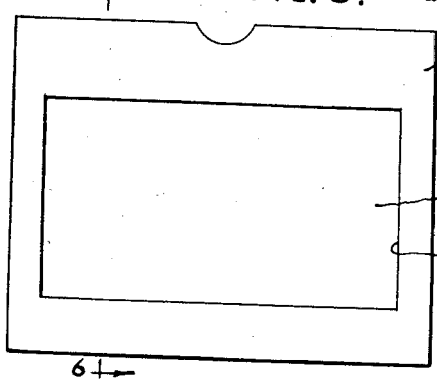
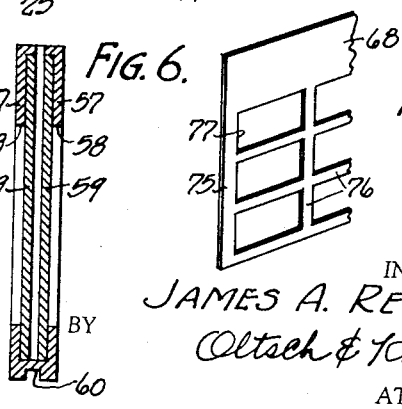
INVENTOR.
JAMES A. REYNIERS
Oltsch & Knoblock
ATTORNEYS.

Patented Nov. 30, 1943

2,335,697

UNITED STATES PATENT OFFICE 2,335,697

PHOTOGRAPHIC APPARATUS

James A. Reyniers, South Bend, Ind.

Application December 9, 1940, Serial No. 369,237

11 Claims. (Cl. 88—24)

This invention relates to photographic apparatus, and more particularly to apparatus for recording multiple single images in spaced relation on a flat film or for projecting any selected one of multiple spaced images on a flat film. Microphotography is one application for which the apparatus is particularly effective.

Microphotography is the method of recording images in small scale upon photographic film. Currently, this is practiced by the use of 35 mm. motion picture film or roll film. Such film requires that short sections comprising a comparatively small number of images be spliced together to form strips which are long enough to be rolled, because short strips of film are difficult to handle and store. However, storage or handling of film rolls is inconvenient, requires special storage containers, and consumes a large amount of storage space. Also, the use of roll film in a projection apparatus, commonly called a reader, is inconvenient, especially where short strips pertaining to related subjects are spliced in a roll. Thus, it is frequently necessary to refer from one to another portion of a roll, as in scientific investigations, and this requires considerable time where the film roll must be rolled or unrolled in order to bring the required separated or isolated images into focus in the reader in the desired sequence.

In general, the use of roll film is subject to the same disadvantages as compared to flat film that scrolls are subject to as compared to books.

It is possible to record multiple micro images on a flat film. For example, by using film of a common size, such as 3¼ inches by 4¼ inches, it is possible to record up to several hundred micro images upon a single film. Such flat film may be handled conveniently and may be filed in conventional card-filing cabinets.

Another advantage of such flat film is that a group of images constituting a unit, such as photographic reproductions of the pages of an article, treatise, pamphlet, brochure, or the like, may be recorded on a single film and conveniently and separately handled and stored or filed. This cannot be done with roll film unless the number of images involved is very large so that the film strip bearing the same may be rolled.

Finally, another advantage of flat film is that all images thereon may be printed simultaneously by contact.

Therefore, the primary object of this invention is to provide novel and simple apparatus for use with either a camera to record, or a reader to project images on a flat film.

A further object is to provide apparatus of this character comprising a cross slide unit and an associated film holder wherein said holder is so related to said slide as to accurately position a selected area of a film relative to a light passage through the cross slide unit.

A further object is to provide an apparatus of this character comprising a cross slide unit having a light passage therethrough wherein one element of said slide constitutes a film holder and is provided with a focusing element laterally displaced from the film in said holder and adapted to be positioned in register with said light passage at will.

A further object is to provide apparatus of this character with removable framing elements for governing the size of the image to be recorded on a film or for accurately restricting the portion of a film to be exposed in a reader.

A further object is to provide photographic apparatus including a film holding cross slide unit and an associated light passage, with means for selecting successive portions of a film to be positioned in register with said light passage for the purpose of arranging multiple images being recorded on the film, or for accurately registering a selected image on a printed film with the light passage of a reader.

A further object is to provide apparatus of this character with means for positively holding a film in flat or planar position.

A further object is to provide photographic apparatus for accurately registering a pre-determined restricted area of photographic film with a light-transmitting passage.

Other objects will be apparent from the description and appended claims.

In the drawing:

Fig. 1 is a view of the device in front elevation.

Fig. 2 is a face view of a photographic film having multiple images recorded thereon in regular geometric relation.

Fig. 3 is a transverse sectional view of the device taken on line 3—3 of Fig. 1.

Fig. 4 is a longitudinal sectional view of the device taken on line 4—4 of Fig. 1.

Fig. 5 is a face view of a ground glass film holder for use in a reader or other projecting apparatus.

Fig. 6 is a sectional view taken on line 6—6 of Fig. 5.

Fig. 7 is a perspective view of a framing element used in the device.

Fig. 8 is a fragmentary transverse sectional view illustrating a modified construction of the means for locking the parts of the apparatus in selected position.

Fig. 9 is a longitudinal sectional view of a film holder for use in exposing a film.

Fig. 10 is a fragmentary perspective view of a film positioning mask used in the film holder.

Referring to the drawing, which illustrates the preferred embodiment of the invention, the numeral 20 designates a frame comprising a flat plate of elongated form having a pair of guides 21 at its opposite longitudinal sides. Intermediate its ends, plate 20 is provided with an elongated rectangular passage 22 whose major dimension extends transversely of the plate with its ends spaced inwardly from the opposite sides of the plate. The rear face of the plate 20 carries a pair of spaced guide elements 23, which receive a flat elongated slide member 24 and position the same in face engagement with the plate 20. Intermediate its ends, plate 24 is provided with an aperture 25 of a length equal to the width of the aperture 22, and with its end edges coinciding with the side edges of the aperture 22. A suitable framing element 26 is mounted in the aperture 25. Framing element 26 comprises a tube or endless member of rectangular cross section. The bore of the member 26 will preferably correspond in size to the size of a conventional 35 mm. image.

A carrier 27 comprising a flat plate having an opening 28 therein of a size corresponding to the area of a film to be exposed or printed and having marginal side walls 29 provided with guide ribs, is slidable on the face of plate 20 opposite slide member 24 and guided by the guides 21. The opening 28 in carrier 27 is positioned centrally of said carrier, and opposite longitudinal edges thereof coincide with or lie flush with the end edges of the opening 22 in plate 20. In longitudinal alignment with opening 28, carrier 27 is provided with an opening 31 which is covered by a suitable ground glass focusing element 32 retained by a marginal frame 33.

The movement of these parts relative to each other from one operative position to another will correspond with the number and size of the images for which the apparatus may be adapted. Suitable locking means are provided for holding the parts against movement in each operative position, said means preferably including a plurality of sets of equi-spaced aligned recesses formed in one or more of the relatively shiftable parts. As here illustrated, one set of recesses 34 is positioned in the face of the plate 20 adjacent one side thereof and extending lengthwise thereof, a second set of longitudinally arranged recesses 35 is formed in the face of plate 20 adjacent the opposite side thereof, and a third set of recesses (not shown) may be formed in the side wall 29 of the carrier 27. A pin 36 may be removably mounted by the carrier plate 27 to seat in a selected one of the recesses 34, a pin 37 may be removably mounted on the plate 27 to seat in a selected one of the recesses 35, and a pin 38 may be removably mounted in the guide 20 to seat in a selected one of the recesses in the carrier wall 29. Also, the slide member 24 may be provided with a plurality of sets of recesses extending longitudinally thereof, for example, the sets 39, 40, and 41. Pins 42, 43 and 44 may be removably mounted in the guides 21 to seat in said recesses of slide 24. Thus, pin 44 may seat in any selected one of recesses 41. The spacing of the recesses in each set will be selected to coincide with the spacing desired for the images of any given size to be recorded on a film in each of two directions.

Thus the recesses 34 and 35 may be used to govern the spacing of images lengthwise of a film, and the spacing of recesses 39, 40, and 41 may be employed to govern the spacing of images on the film transversely thereof. More specifically, the spacing of the recesses may be so proportioned and dimensioned that the largest thereof will govern spacing of 35 mm. images on a film, the intermediate thereof will govern the spacing of 16 mm. images on a film, and the smallest thereof will govern the spacing of 8 mm. images on a film. It will be understood, however, that the sizes above given are illustrative only and not limiting.

As best illustrated in Figs. 3 and 4, the framing element 26 carried by the slide member 24 is preferably of a length to extend entirely through the plate 20. Hence, it will be seen that the framing element serves the additional function of limiting the extent of adjustment of slide 24 relative to plate 20 so as to insure that the framing element is always in register with some portion of the elongated opening 22 of plate 20. While the framing element has been illustrated in Figs. 1, 3, and 4 as having flat walls, this construction is useable only for the largest size of image for which the apparatus is to be useable. Thus, it is necessary to replace this type of framing element with another element having a smaller opening therethrough whenever smaller images are to be photographed or projected. In this connection, I have illustrated in enlarged size a framing element adapted for use with smaller images, in Fig. 7. This framing element comprises a flat marginal portion 45 from whose inner edge projects a rectangular flange portion 46. Portion 45 is of a dimension to fit within the opening 25 of the cross plate 24, and flange 46 is adapted to project into the opening 22 of the plate 20. Thus, it will be seen that a separate framing element of accurately determined size must be provided for each size of image which the apparatus is to record or handle.

While the apparatus here shown is of the manual locking type, it may be rendered automatic by the use of a construction as illustrated in Fig. 8. Thus, assuming that Fig. 8 is a section, on an enlarged scale, taken through the guide 21 and the slide 24, said slide may be provided with the usual recesses 47 and guide member 21 may be provided with a bore 48, receiving a small coil spring 49 pressing upon a ball 50 which will snap into and out of the recesses 47 when said slide is positively shifted by the user. In order to successfully use this construction, it may be preferred to provide a plurality of slide members 24 and carrier members 27 each having only one series of recesses therein spaced as required for use with one particular size of film image, and adapted to be aligned with the spring pressed ball 50 when inserted in the apparatus.

It will readily be observed from the above that it is possible by the use of this device to record upon a flat film 51 of any desired size, as for example, of a size 3¼ inches by 4¼ inches, a plurality of images 52 arranged in spaced relation and in a regular or geometric pattern, as best illustrated in Fig. 2. In this connection, it will be desirable that a sufficient unprinted margin 53 be left upon the film so that it may bear a title 54 at its upper edge suitably lettered or otherwise applied thereto. Assuming that it is desired to record images upon sensitive film in the arrangement illustrated in Fig. 2, a suitable film holder is first mounted upon a carrier 27, being retained by guide ribs 30 thereof in accurate desired relation thereto. A suitable lens and shutter unit 55, as illustrated in side elevation in Fig. 3, is mounted upon the apparatus at the outer face of the slide 24 centered relative to the opening 25 and the framing element 26. When these parts have been properly assembled relative to the cross slide apparatus they constitute a camera. The images which will be recorded on the film by this camera will be governed by the size of the framing element selected. When the camera is to be used and has been properly positioned relative to the light source and the object to be photographed, the carrier 27 is first moved to position the ground glass focusing element 32 above the light passage of the camera defined by framing element 26 for the purpose of checking the focus of the camera upon the work. Then the cross slide 24 and the carrier 27 are adjusted to the desired position for the purpose of recording the first image upon the film, for example, the image 56 at the upper left-hand corner thereof. In this connection, it will be understood that the proper ones of the pins 36, 37, 38, 42, 43, and 44 will be pressed into the recess of the cooperating set of recesses corresponding with the selected film position to lock the parts in operative position during the time the exposure is being made. Thereafter, a second object may be positioned within the range of the camera, and the carrier 27 shifted one step as governed by the proper locking pin, and a second image may be recorded upon the film in accurately spaced position relative to the first image. This operation may be repeated until one row of spaced images has been recorded on the film. Then the cross slide 24 may be shifted one step, and the series of operations repeated to record a second row of spaced images upon the film. It will be seen that the operations are accurate, and that full control of the apparatus from the standpoint of focusing and positioning is afforded.

When exposed film 51 is to be used in a reader, it is mounted within a film holder of the type best illustrated in Figs. 5 and 6. This film holder preferably comprises a pair of spaced opposed retainer portions 57 having registering openings 58 therein and mounting a pair of glass plates 59, one of which is ground glass, in close spaced parallel relation. Thus the film holder provides a narrow flat chamber for the film, of such character that the film will be held in positive flat or planar position. This holder 57 may be inserted in the carrier 27 to be held therein by engagement of end grooves 60 of the film holder with the guide ribs 30 of the carrier 27. Any suitable reader having a lens system and a source of light with which the framing element 26 may be aligned may be used. Any selected image upon the film may be brought into focus with the light passage by adjustment of the carrier 27 and of the slide member 24, and reference from one to another of the images 52 upon the film may easily be had by adjustment of said carrier 27 and slide 24, as will be observed. Also, it will be obvious that the parts of the device may be locked in selected position in the reader by means of the locking pins, or the locking construction illustrated in Fig. 8, to maintain the desired register between the light path and the film image to be exposed.

One of the requirements for the successful use of flat film in microphotography is that the film be maintained in flat condition through its entire extent during the time that it is being exposed, and also during the time that it is being viewed in a reader or projector. The film holder 57 for use in a projector or reader serves this purpose by providing the plates 59 which hold a film against distortion. Suitable means are required for the same purpose when the film is being exposed, and I have provided means for this purpose as best illustrated in Figs. 9 and 10. Referring to Fig. 9, I have provided a film holder 61 having a base plate 62 and marginal confining walls 63. Some of the walls 63 are provided with grooves 64 adapted to seat upon the guide ribs 30 of the carrier 27. A large opening 65, adapted to coincide with the area of the film or preferably being larger than said film, is formed in the front of the holder. Within this holder I provide one or more springs 66 urging a pressure plate 67 toward the front of the holder. The film 51 is laid flat upon the pressure plate 67, and a shield or mask 68 is applied over the film in face contact therewith. The mask 68 is best illustrated in Fig. 10 and comprises a rigid metal sheet having a series of openings 77 therein of the same size as the images to be recorded upon the film. A film retainer 69 pivoted in the film holder at 70 and having an opening 71 therein of a size equal to full area of the film to be exposed, is adapted to press upon the margin of the mask 68. Retainer 69 may be provided with a bent end 72 adapted to be engaged and locked by a spring locking member 73. The usual light shield plate 74 may be slidably mounted in the holder between the opening 65 and the film retainer 69.

Hence, it will be observed that the film 51 bears at one face upon the base plate 67, which is outwardly spring pressed in the direction of the retainer by spring 66. The other face of the film is engaged by the mask at its marginal portions 75 and also by the cross bars 76 of the mask, so that there is no possibility that the film may become distorted or bent out of true flat position. This insures the provision of sharp edges or margins, defined by the parts of the mask surrounding each opening 77 of the mask, for each image recorded upon the film. In this way, the blurring distortion or irregularity of the images recorded, which might be experienced in the use of flat film for microphotography if the film was bent out of flat form, is avoided. It will be understood, of course, that the mask 68 may be used with various types of film holders and that the construction illustrated in Fig. 9 is illustrative only and not limiting.

It will be understood that a separate mask 68 is required for each of the different sizes of images to be recorded upon the film; and that it will be necessary to change the mask used, just as it is necessary to change the framing element used, each time a change is made from one size of image to another size.

Throughout this specification I have referred to the use of the device for microphotography. Such references have been for purposes of illustration only and I do not wish to limit the device to its application to microphotography only. Thus, it will be observed that the apparatus may be used for other purposes, such as for microcopying, or for general photography where a multiple of separate images, all of a size to be easily read without the necessity of enlargement by projection, may be imposed in desired relation upon a single film.

I claim:

1. In a photographic device, a frame having a flat portion provided with an elongated opening therein, guides projecting from opposite faces of said frame portion, a slide member shiftable on said frame parallel to the length of said frame opening and having a restricted opening therein registering with said frame opening in all operative positions thereof, a lens mount secured to said slide member in register with said slide opening, a carrier slidable on said frame transversely of said slide member and having an opening therein larger than said frame opening and registering therewith in all operative positions thereof, said carrier being adapted to support a film in register with its opening, said guides holding said slide and carrier in face engagement with opposite faces of said flat frame portion in all operative adjusted positions thereof.

2. The combination defined in claim 1, wherein the major dimension of said frame opening is equal to the minor dimension of said carrier opening and the major dimension of the opening in said slide member is equal to the minor dimension of said frame opening.

3. The combination defined in claim 1, and a framing element removably carried by said slide member and seating in said frame opening to limit movement of said slide on said frame.

4. In a microphoto device, a flat plate having an elongated opening therein, guide means projecting from opposite faces of said plate, a slide plate shiftably carried by one guide parallel to the major dimension of said plate opening and held in face engagement with said plate by one guide, said slide having a restricted opening therein coinciding with said plate opening, a film carrier shiftably carried by and held in engagement with said first plate by the other guide, and a lens mount secured to said slide in register with said slide opening.

5. The combination defined in claim 4, and a framing element removably mounted in the slide opening.

6. The combination defined in claim 4, and a framing element removably mounted in the slide opening and projecting through the plate opening to limit the extent of relative movement of said slide and plate.

7. In a microphoto device, a flat apertured frame, a flat apertured slide bearing against one face of said frame and shiftable transversely of said frame, an apertured carrier having a flat face bearing against and longitudinally slidable on the opposite face of said frame, guides on said frame engaging and retaining said slide and carrier, said apertures coinciding to define a restricted light passage, a lens mount secured to said slide in registration with said passage, a film holder mounted on said carrier, and film engaging means carried by and cooperating with said carrier for holding a film in flat position throughout its full extent in a plane precisely spaced from said lens mount.

8. The combination defined in claim 7, wherein said last named means includes a flat rigid opaque plate adapted to engage one face of a film and having apertures of the same size as said light passage, a flat rigid spring pressed means for engaging the opposite face of a film.

9. A photographic device having a restricted passage for transmitting light through a selected portion only of a film, comprising an apertured member, a lens mount carried by said member in register with the aperture thereof, a member reciprocable relative to said first member in one direction and having an elongated opening registering with the aperture of said first member, a film carrying member mounted on said last named member for reciprocation relative to said first member in a path parallel and at an angle to said first mentioned reciprocation, and guides carried by at least one member for retaining all of said members in parallel contact relation.

10. A photographic device having a lens, a lens mount, a member carrying said lens mount and having an opening registering with said lens, a second member bearing against and slidable relative to said first member and having a flat portion provided with an opening coinciding with said first opening and elongated in the direction of its movement relative to said lens mounting member, and a film carrier bearing against the face of the flat portion of said second member opposite said first member and reciprocable in a path perpendicular to and in a plane parallel to the movement of said second member, said second member and said means being shiftable relative to said first member to position any selected portion of said film in register with said lens.

11. In a microphoto device, a cross slide unit comprising a pair of relatively transversely shiftable face engaging apertured flat units defining a restricted light passage, a lens mount secured to one unit in registration with said passage, a film carrier bearing against and longitudinally adjustable on one of said members, a flat rigid opaque film engaging mask in said carrier having a plurality of spaced openings complementary to said light passage, and a rigid film engaging plate in said carrier spring pressed toward said mask.

JAMES A. REYNIERS.

Patent No. 2,335,697                          Granted November 30, 1943

JAMES A. REYNIERS

The above entitled patent was extended November 27, 1951, under the provisions of the act of June 30, 1950, for 2 years and 328 days from the expiration of the original term thereof.

*Commissioner of Patents.*